TRUSCOTT, WOLF & DOUGHERTY.
Car Wheel.
No. 640.
Patented Mar. 17, 1838.
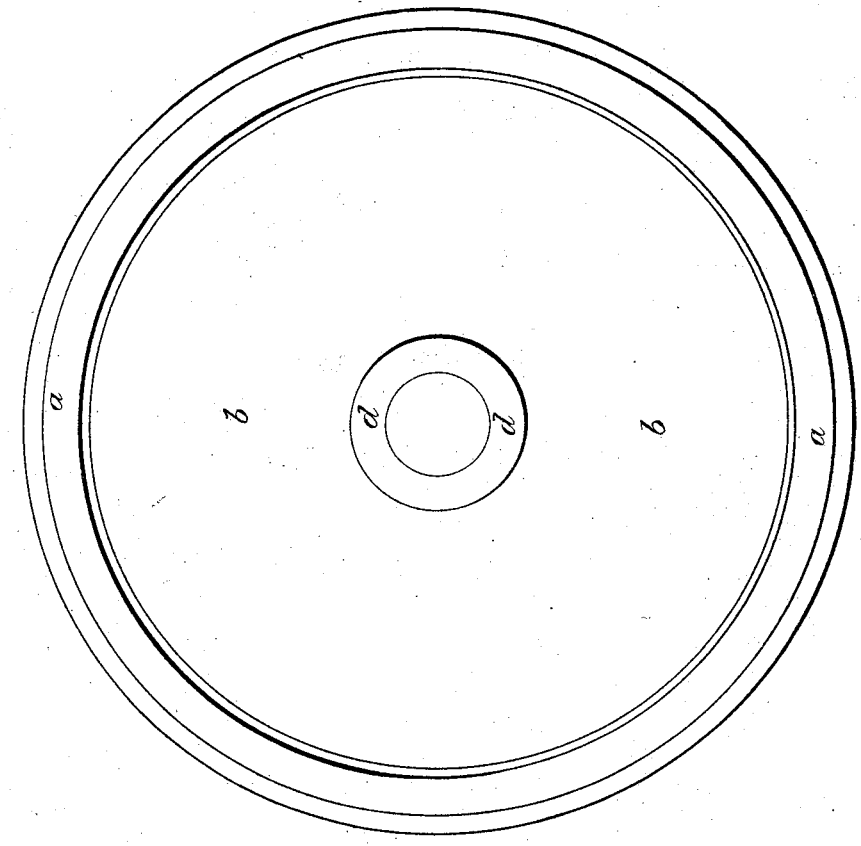
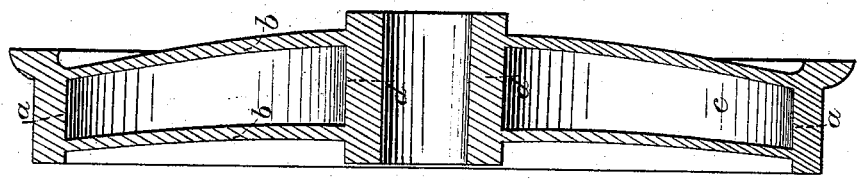

UNITED STATES PATENT OFFICE.

SAMUEL TRUSCOTT, GEO. WOLF, AND JAMES DOUGHERTY, OF COLUMBIA, PENNSYLVANIA.

MODE OF MAKING CAST-IRON WHEELS TO BE USED ON RAILROADS AND APPLICABLE TO OTHER PURPOSES.

Specification of Letters Patent No. 640, dated March 17, 1838.

*To all whom it may concern:*

Be it known that we, SAMUEL TRUSCOTT, GEORGE WOLF, and JAMES DOUGHERTY, of the borough of Columbia, in the county of Lancaster and State of Pennsylvania, have invented a new and Improved Mode of Constructing Cast-Iron Wheels for Railroad-Cars and for other Purposes; and we do hereby declare that the following is a full and exact description thereof.

We denominate our wheel, the double plate car wheel, because we use two plates instead of the spokes, or arms, usually employed; which plates are cast with the rim, and form one substance therewith. We give to the rim of our wheels the same form in all respects as is now given to the rims of car wheels, but instead of arms we cast our wheels with two parallel, or nearly parallel, plates, which plates are convex on one side, and concave on the other; the hub, or nave, which is to receive the axle, is cast in the center of these plates, extending from one of them to the other.

The accompanying drawing gives a sectional view of one of our wheels *a, a,* being the rim *b, b,* the front and back plates, convex on one side, and concave on the other, *c, c,* being the hollow or void space between them, and *d, d,* the nave or hub. The hollow *c, c,* between the two plates is formed by a core, in the process of casting, which core is supported in the flask by leaving suitable holes in the plates for that purpose, which holes serve also for the removal of the sand of which the core is formed.

We cast our rim in a chill, in the usual manner, and in consequence of the particular form given to the plates, they contract in cooling without danger of fracture and without its being necessary to divide the hub, as is done when car wheels are cast with spokes or arms. The only effect of construction is to flatten the two plates in a slight degree, operating in this respect like the curved arms of many cast iron wheels.

We are aware that car wheels have been made with plates as a substitute for arms, but such plates have been made separate from the wheels and united together by screwed bolts, embracing the hub in a distinct piece between them. The difference between such wheels and those constructed by us is so obvious as not to need pointing out.

What we claim as our invention, and wish to secure by Letters Patent, is—

The manner of constructing wheels for railroad cars, or for other purposes to which they may be applied, with double convex plates, one convex outward and the other inward, and an undivided hub, the whole cast in one piece, as herein fully set forth.

SAML. TRUSCOTT.
GEORGE WOLF.
JAMES DOUGHERTY.

Witnesses:
SELBRIGHT LANG,
THOS. LLOYD.